United States Patent [19]
Yamada et al.

[11] Patent Number: 5,274,681
[45] Date of Patent: Dec. 28, 1993

[54] CLOCK RECOVERY CIRCUIT WITH MEMORY STORAGE LEVEL COMPARISON WITH HIGH, MEDIUM AND LOW THRESHOLDS

[75] Inventors: Hiroki Yamada, Tokyo; Toru Shibuya, Miyagi, both of Japan

[73] Assignee: NEC Corporation, Japan

[21] Appl. No.: 859,038

[22] Filed: Mar. 27, 1992

[30] Foreign Application Priority Data

Mar. 27, 1991 [JP] Japan .................. 3-085903

[51] Int. Cl.$^5$ .............................. H04L 7/00
[52] U.S. Cl. ............................ 375/118; 370/102
[58] Field of Search ............ 375/106, 108, 118, 119, 375/120; 370/102, 108

[56] References Cited
U.S. PATENT DOCUMENTS

| | | | |
|---|---|---|---|
| 4,323,790 | 4/1982 | Dunning et al. | 370/102 |
| 4,945,548 | 7/1990 | Iannarone et al. | 370/102 |

Primary Examiner—Curtis Kuntz
Assistant Examiner—Hai H. Phan
Attorney, Agent, or Firm—Ostrolenk, Faber, Gerb & Soffen

[57] ABSTRACT

A coded image signal is received and stored into a first-in-first-out memory on a bit-parallel word basis and the storage level of the memory is compared with high, medium and low threshold values. A first positive trimming value is generated when the storage level is higher than the high threshold, a second positive trimming value when it lies between the high and medium thresholds, a first negative trimming value when it is lower than the low threshold, and a second negative trimming value when it lies between the low and medium thresholds. Differential sampling clock rate is received and combined with each trimming value in an adder whose output is subtractively combined with a frequency variation of the line clock rate to produce a corrected differential sampling and line clock rate. The latter is integrated to produce a frequency control signal that drives a voltage-controlled oscillator whose output is used to drive the memory for reading the coded image signal on a bit-parallel word basis.

2 Claims, 1 Drawing Sheet

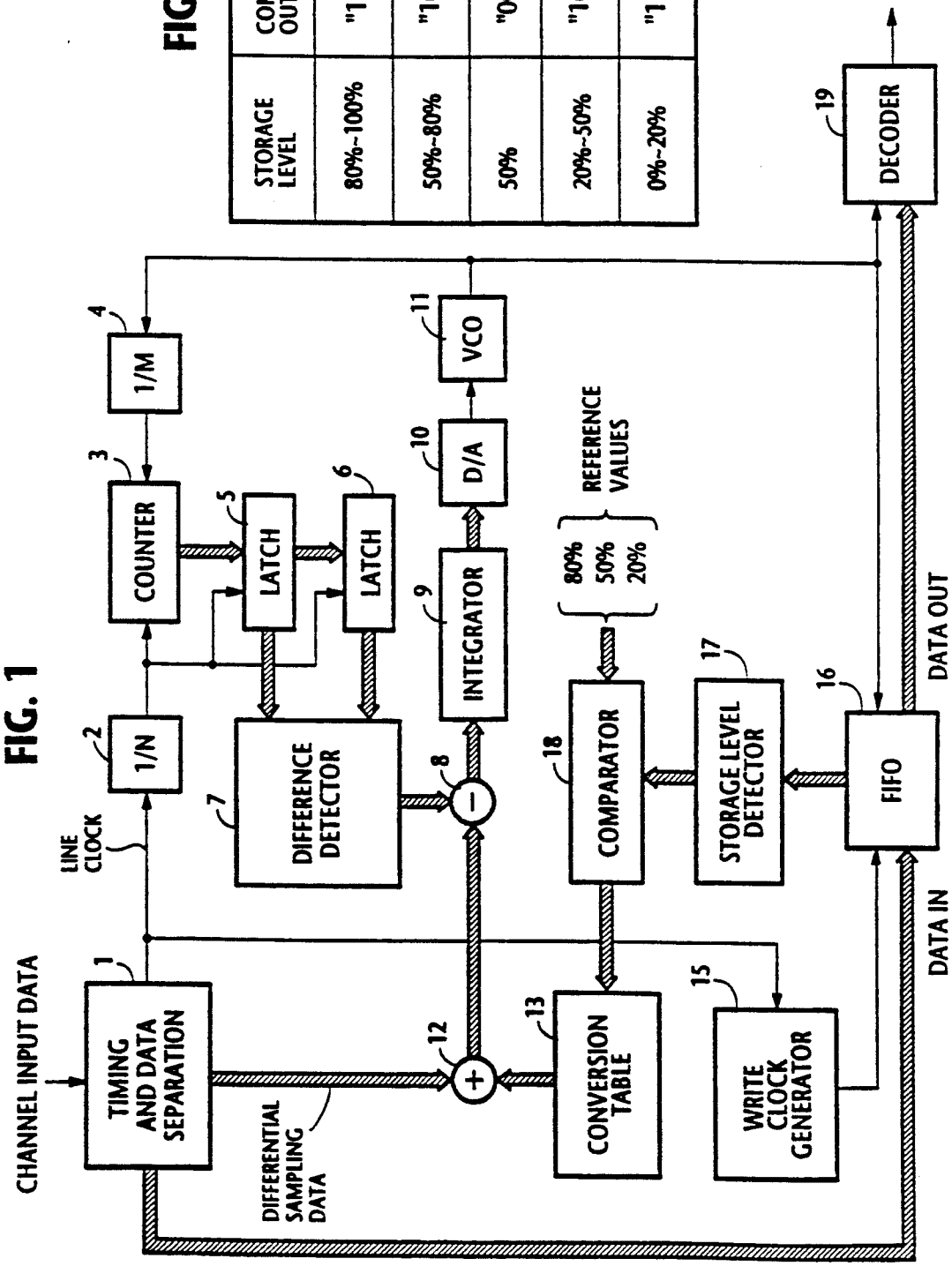

CLOCK RECOVERY CIRCUIT WITH MEMORY STORAGE LEVEL COMPARISON WITH HIGH, MEDIUM AND LOW THRESHOLDS

BACKGROUND OF THE INVENTION

The present invention relates to a sample clock recovery circuit.

In a conventional digital visual communications system, an analog image signal is sampled, converted to a digital bit stream and transmitted at a line clock rate. At the receiving end of the system, the transmitted digital signal is written into a first-in-first-out (FIFO) memory on a bit-parallel word basis and read out of the memory in response to a local sampling pulse generated by a frequency control feedback loop. The output signal of the memory is supplied to a decoder where it is decoded into analog form for reproduction of the original image. The storage level of the FIFO memory is compared with reference levels to detect when the memory is almost full or almost empty. A frequency trimming signal which represents a predetermined amount of frequency is generated in response to each of these conditions and added to or subtracted from the local sampling rate depending on these conditions to prevent the memory from being overflowed or underflowed. Under the stabilized condition, the local sampling rate is synchronized with the transmitted sampling rate.

However, if a change occurs in the transmitted sampling rate when the storage level of the memory is in the neighborhood of the almost full or almost empty condition, the local sampling rate is rapidly changed and timing instability occurs in the reproduced image.

SUMMARY OF THE INVENTION

It is therefore an object of the present invention to provide a sampling clock recovery circuit which is free from timing instability.

According to the present invention, there is provided a sampling clock recovery circuit for receiving a coded image signal which is sampled at a sampling rate and transmitted at a line clock rate through a communication channel. The coded image signal contains differential sampling clock data representative of a frequency variation of the sampling rate. The sampling clock recovery circuit comprises a first-in-first-out memory which is driven by a write clock to store the received coded image signal on a bit-parallel word basis. A frequency correcting circuit is provided which detects the storage level of the memory, compares it with high, medium and low threshold values, and generates a first positive trimming value when the storage level is higher than the high threshold value, a second positive trimming value when it is between the high threshold value and the medium threshold value, a first negative trimming value when it is lower than the low threshold value, and a second negative trimming value when it lies between the low and medium threshold values. The differential sampling clock data and each one of the trimming values are combined in an adder, and a frequency variation of the line clock rate is detected and subtractively combined with the output of the adder to produce a corrected differential sampling and line clock data, which is integrated to produce a frequency control signal that drives a voltage-controlled oscillator (VCO). The output of the VCO is a local sampling clock which is used to drive the FIFO memory for reading the coded image signal therefrom on a bit-parallel word basis.

BRIEF DESCRIPTION OF THE DRAWINGS

The present invention will be described in further detail with reference to the accompanying drawings, in which:

FIG. 1 shows in block form a sampling clock recovery circuit of a digital visual communication system according to the present invention; and FIG. 2 shows relationships between FIFO storage levels, comparator outputs and frequency trimming values.

DETAILED DESCRIPTION

As represented in FIG. 1, the sampling clock recovery circuit of this invention for a digital visual communications system comprises timing and data separation, or demultiplexing circuitry 1 to which channel input data from the transmit end of the system is supplied and separated into a line clock pulse, differential sampling clock data and a coded image signal. The extracted line clock pulse is applied to a divide-by-N frequency divider 2 and to a write clock generator 15 which produces write clock pulses synchronized with bit-parallel words of the coded image signal. The differential sampling clock data is a signal that has been multiplexed at the transmit end with the coded image signal to constantly indicate the amount of variations in the sampling rate with which it is being sampled. This differential sampling clock data is supplied to an adder 12 to be arithmetically combined with a frequency trimming signal from a conversion table 13. The extracted data signal is stored into a FIFO (first-in-first-out) memory 16 on a per-word basis by using the write clock supplied from write clock generator 15. Image data signals are read out of FIFO memory 16 by using the output of a voltage-controlled oscillator (VCO) 11 as a clock pulse at the local sampling rate. The output data from FIFO memory 16 is fed into a decoder 19 to which the local sampling clock from VCO 11 is also supplied as a decode timing signal to allow it to produce a replica of the original analog image signal.

The output of divide-by-N frequency divider 2 is applied as a reset pulse to a binary counter 3 to reset its binary count value at 1/N of the line clock interval. The frequency of the output of VCO 11 is reduced by a divide-by-M frequency divider 4 to an appropriate level which is higher than the output frequency of the divider 2, and supplied to counter 3 to increment its binary output count. Latches 5 and 6 are coupled to counter 3 to successively store the output of the counter 3 in response to the output of the frequency divider 2. The difference between the outputs of latches 5 and 6 is detected by a difference detector 7 as a signal indicating a frequency variation in the transmitted line clock rate, and supplied to a subtractor 8 in which it is combined with the output of adder 12.

In this way, a difference between the transmitted differential sampling rate and the transmitted differential line clock rate appears at the output of subtractor 8, and is applied to a digital integrator 9 to generate an output signal representative of the local sampling rate. The output of digital integrator 9 is converted to analog form by a digital-to-analog converter 10 and applied as a frequency control signal to VCO 11.

A storage level detector 17 is connected to FIFO memory 16 to monitor the storage level of the memory and produces a signal representative of the data occupancy of the memory. The output of storage level detector 17 is applied to a digital comparator 18 in which it is compared with reference storage levels which are respectively set to the 20%, 50% and 80% occupancies of FIFO memory 16 to produce a three-bit parallel output signal.

As shown in FIG. 2, comparator 18 produces a "110" output when the occupancy of FIFO memory 16 is equal to or lower than 20%, a "100" output when it is higher than 20% but lower than 50%, a "101" output when it is higher than 50% but lower than 80%, and a "111" output when it is equal to or higher than 80%. When the memory occupancy is 50%, comparator 18 produces a "000" output which is translated by conversion table 13 into a zero trimming value.

The output of comparator 18 is applied to the conversion table 13 in which it is translated into one of predetermined frequency trimming values and supplied to adder 12. As shown in FIG. 2, the three-bit outputs "111", "101", "100" and "110" of comparator 18 are translated respectively to trimming values $+\alpha$, $+\beta$, $-\beta$ and $-\alpha$ and supplied to adder 12.

Assume that FIFO memory 16 is occupied to a level below the 20% value (i.e., almost empty state), comparator 9 produces a "110" output and the local sampling rate is decremented by an amount corresponding to the trimming value $\alpha$ so that the storage level of memory 16 will eventually increase to a level higher than the 20% value, causing comparator 18 to produce a "100" output. Therefore, the local sampling rate is further decremented by an amount corresponding to the trimming value $\beta$ until the storage level reaches the 50% value. When this occurs, comparator 18 output is "000" and no trimming value is generated. Therefore, the local sampling clock is locked with the transmitted sampling clock rate, and the storage level of the memory is maintained at the 50% occupancy.

If FIFO memory 16 is occupied to a level above the 80% value (i.e., almost full state), comparator 9 produces a "111" output and the local sampling rate is incremented by an amount corresponding to the trimming value $\alpha$ so that the storage level of memory 16 will eventually decrease to a level lower than the 80% value, causing comparator 18 to produce a "101" output. Therefore, the local sampling rate is further incremented by an amount corresponding to the trimming value $\beta$ until the storage level reaches the 50% value. When this occurs, no trimming value is generated and the local sampling clock is locked with the transmitted sampling clock rate, and the storage level of the memory is maintained at the 50% occupancy.

Since the local sampling rate is successively varied when an almost full or almost empty state is detected, the data stored in FIFO memory 16 is varied in successive stages by such an amount that no timing instability occurs in the image data delivered from the memory. In addition, since the local sampling rate can be locked to a point corresponding to the 50% occupancy of FIFO memory 16, sufficient safety margins are secured against both almost full and almost empty conditions.

What is claimed is:

1. A sampling clock recovery circuit for receiving a coded image signal sampled at a sampling rate and transmitted at a line clock rate through a communication channel, said coded image signal containing a signal indicating a differential sampling clock rate representative of a frequency variation of said sampling rate, said sampling clock recovery circuit comprising:

a first-in-first-out memory;

means for driving a write clock of said first-in-first-out memory for writing the received coded image signal on a bit-parallel word basis into said first-in-first-out memory;

a frequency correcting circuit including means for detecting a storage level of said first-in-first-out memory, comparing the storage level with an uppermost reference range, a higher middle reference range, a lower middle reference range and a lowermost reference range, and generating a first positive trimming value when the storage level is in said uppermost reference range, a second positive trimming value when the storage level is in said higher middle reference range, a first negative trimming value when the storage level is in said lower middle reference range, and a second negative trimming value when the storage level is in said lowermost reference range; and a local sampling clock generator including an adder for combining said signal indicating a differential sampling clock rate and one of said trimming values to produce a signal indicating a corrected differential sampling clock rate, means for detecting a frequency variation of said line clock rate to produce a signal indicating a differential line clock rate and subtractively combining the signal indicating a differential line clock rate with said signal indicating a corrected differential sampling clock rate to produce a difference signal, an integrator for integrating said difference signal, and a voltage-controlled oscillator responsive to an output signal of said integrator for driving a read clock of said first-in-first-out memory for reading the coded image signal therefrom on a bit-parallel word basis.

2. A sampling clock recovery circuit as claimed in claim 1, wherein said means for detecting a frequency variation of said line clock rate includes counter means for counting an output pulse of said voltage-controlled oscillator to produce a count output at intervals defined by the transmitted line clock rate, and means for detecting a difference between successively generated count outputs of said counter means to produce said signal indicating a differential line clock rate.

* * * * *